(12) United States Patent
Robinson et al.

(10) Patent No.: US 10,965,001 B2
(45) Date of Patent: Mar. 30, 2021

(54) UNIVERSAL INDUSTRIAL TRANSMITTER MOUNTING

(71) Applicant: Rosemount Inc., Shakopee, MN (US)

(72) Inventors: Cory Robinson, Mayer, MN (US);
Jared Neuharth, Shakopee, MN (US);
Zach Marso, Lino Lakes, MN (US);
Hun Chhuoy, Savage, MN (US)

(73) Assignee: ROSEMOUNT INC., Shakopee, MN (US)

( * ) Notice: Subject to any disclaimer, the term of this patent is extended or adjusted under 35 U.S.C. 154(b) by 140 days.

(21) Appl. No.: 16/426,384

(22) Filed: May 30, 2019

(65) Prior Publication Data

US 2020/0381800 A1    Dec. 3, 2020

(51) Int. Cl.
*H01Q 1/12*    (2006.01)
*H01Q 1/24*    (2006.01)
*G01D 11/24*   (2006.01)
*G01F 15/18*   (2006.01)
*G01D 11/30*   (2006.01)

(52) U.S. Cl.
CPC ......... *H01Q 1/1228* (2013.01); *G01D 11/245* (2013.01); *G01D 11/30* (2013.01); *G01F 15/18* (2013.01); *H01Q 1/12* (2013.01); *H01Q 1/24* (2013.01); *H01Q 1/242* (2013.01)

(58) Field of Classification Search
CPC ........ H01Q 1/1228; H01Q 1/242; H01Q 1/12; H01Q 1/24; G01F 15/18; G01D 11/245; G01D 11/30
USPC ........................................................ 343/702
See application file for complete search history.

(56) References Cited

U.S. PATENT DOCUMENTS

| 4,893,426 A * | 1/1990 | Bixler ................ F16B 7/20 403/299 |
| 5,877,703 A * | 3/1999 | Bloss, Jr. ............ G01D 4/004 340/870.02 |
| 7,448,275 B1 | 11/2008 | Sundet et al. |

(Continued)

FOREIGN PATENT DOCUMENTS

| EP | 2 287 973 | 2/2011 |
| EP | 2 772 729 | 9/2014 |
| EP | 1 979 719 | 11/2016 |

OTHER PUBLICATIONS

Conwork 2-Pack Female Jack Panel Mount Socket Connector, www.amazon.com, printed on Aug. 9, 2019.

(Continued)

*Primary Examiner* — Hai V Tran
(74) *Attorney, Agent, or Firm* — Westman, Champlin & Koehler, P.A.

(57) ABSTRACT

An industrial transmitter assembly includes an industrial transmitter and a transmitter mount. The transmitter includes electronics contained in a housing. The transmitter mount is configured to attach the housing to a structure and includes a stem member, an adaptor and a locking member. The stem member includes a first end connected to the housing of the transmitter, and a second end having a flange or a first twist-lock connector. The adaptor is configured for attachment to the structure and includes a base member having a slot configured to receive the flange or a second twist-lock connector configured to attach to the first twist-lock connector. The locking member is configured to secure the second end of the stem to the base member.

19 Claims, 7 Drawing Sheets

(56) References Cited

U.S. PATENT DOCUMENTS

| | | | |
|---|---|---|---|
| 7,984,652 B2* | 7/2011 | Hausler | G01L 19/14 |
| | | | 73/756 |
| 9,971,316 B2* | 5/2018 | Jia | G05B 13/02 |
| 2006/0025008 A1* | 2/2006 | Beck | H01R 13/6392 |
| | | | 439/502 |
| 2007/0268153 A1* | 11/2007 | Gansen | G01D 11/245 |
| | | | 340/870.01 |
| 2012/0063101 A1* | 3/2012 | Schwartz | G06F 3/0202 |
| | | | 361/752 |
| 2012/0157018 A1* | 6/2012 | Robinson | G01D 11/24 |
| | | | 455/127.1 |

OTHER PUBLICATIONS

Sequoia Twist Lock Leg Kit, PontoonStuff.com, printed on Aug. 9, 2019.

Notification of Transmittal of the International Search Report and the Written Opinion of the International Searching Authority from International Application No. PCT/US2020/013982, dated May 4, 2020.

* cited by examiner

UNIVERSAL INDUSTRIAL TRANSMITTER MOUNTING

FIELD

Embodiments of the present disclosure relate to industrial transmitters and, more specifically, to techniques for mounting industrial transmitters to a structure.

BACKGROUND

In industrial settings, control systems are used to monitor and control inventories of industrial and chemical processes, and the like. Typically, the control system performs these functions using transmitters distributed at key locations in the industrial process. Some transmitters perform process parameter monitoring and measurements using one or more sensors, and/or process control operations using one or more control elements. Exemplary sensors include pressure sensors, flow sensors, level sensors, temperature sensors, and other sensors used in industrial processes. Exemplary control elements include actuators, solenoids, valves, and other control elements.

Other industrial transmitters may be used to track "tags" worn by personnel or attached to assets in the processing plant. Here, the transmitters are positioned in a grid pattern and wirelessly communicate with the tags to determine the location of the tags based on a received signal strength indicator of the communication with the tags.

SUMMARY

Embodiments of the present disclosure are directed to industrial transmitter assemblies for use in industrial systems. One embodiment of the assembly includes an industrial transmitter and a transmitter mount. The transmitter includes electronics contained in a housing. The transmitter mount is configured to attach the housing to a structure and includes a stem member, an adaptor and a locking member. The stem member includes first and second ends. The first end is connected to the housing of the transmitter. The second includes a flange oriented substantially perpendicularly to a longitudinal axis of the stem member or a first twist-lock connector. The adaptor is configured for attachment to the structure and includes a base member having a slot configured to receive the flange or a second twist-lock connector configured to attach to the first twist-lock connector. The locking member is configured to secure the second end of the stem to the base member.

In accordance with another embodiment, the industrial transmitter assembly includes an industrial transmitter and a transmitter mount. The transmitter includes electronics contained in a housing. The transmitter mount is configured to attach the housing of the transmitter to a structure and includes a stem member, an adaptor and a locking member. The stem member has first and second ends. The first end is connected to the housing of the transmitter. The second end includes a flange oriented substantially perpendicularly to a longitudinal axis of the stem. The adaptor is configured for attachment to the structure and includes a base member having a flange slot and a threaded projection. The flange slot is defined by an outer surface of the base member and a shoulder displaced from the outer surface. The threaded projection extends from the shoulder along a central axis and has an interior cavity and a stem slot extending along the central axis. The flange slot is configured to receive the flange through an opening formed between opposing ends of the shoulder and the outer surface of the base member, and support the flange between the outer surface and the shoulder. The stem member passes through the stem slot in the threaded projection and into the interior cavity when the flange is received in the flange slot through the opening. The locking member includes a threaded collar through which the stem member extends. The threaded collar is configured to attach to the threaded projection of the base member and secure the second end of the stem member to the base member.

In yet another embodiment, the industrial transmitter assembly includes an industrial transmitter and a transmitter mount. The industrial transmitter includes electronics contained in a housing. The transmitter mount is configured to attach the housing of the transmitter to a structure and includes a stem member, an adaptor and a locking member. The stem member has first and second ends. The first end is connected to the housing of the transmitter. The second end includes a first twist-lock connector. The adaptor is configured for attachment to the structure and includes a base member having a second twist-lock connector and a threaded projection. The first and second twist-lock connectors include cooperating projections and slots for receiving the projections and attaching the first and second twist-lock connectors together. The locking member includes a threaded collar through which the stem member extends. The threaded collar is configured to attach to the threaded projection of the base member and secure the second end of the stem member to the base member.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
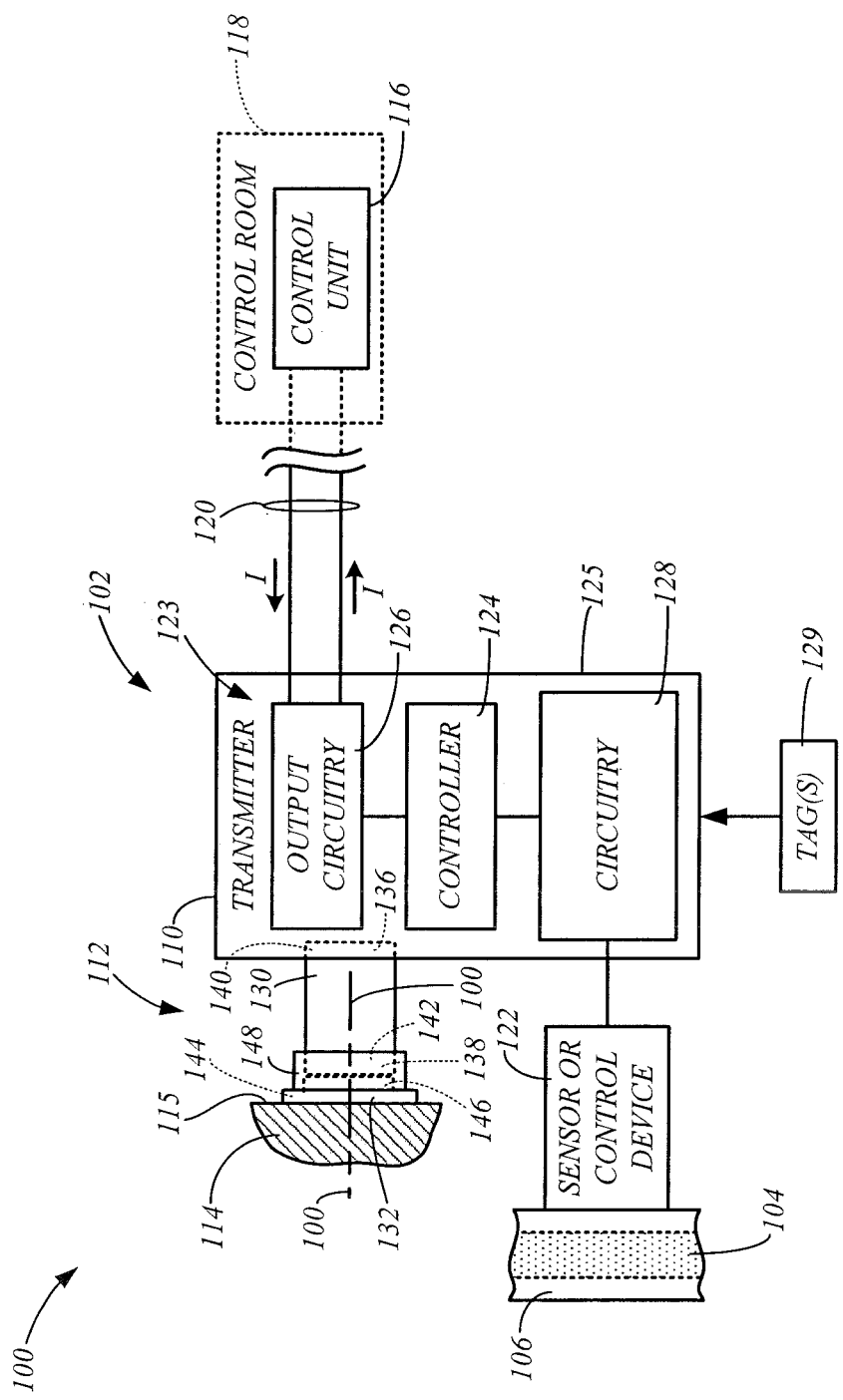
FIG. 1 is a simplified diagram of an industrial process measurement or control system that includes a transmitter assembly in accordance with embodiments of the present disclosure.

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Specific details are given in the following description to provide a thorough understanding of the embodiments. However, it is understood by those of ordinary skill in the art that the embodiments may be practiced without these specific details. For example, conventional circuits, systems, networks, processes, frames, supports, connectors, motors, processors, and other components may not be shown, or are shown in block diagram form in order to not obscure the embodiments in unnecessary detail.

FIG. 1 is a simplified diagram of an industrial system 100 that includes a transmitter assembly 102 in accordance with embodiments of the present disclosure. The system 100 may be used in a process involving a process material 104 that is contained in a process vessel 106, such as a tank, a pipe, or another process vessel. The process material may take the form of a fluid (i.e., liquid or gas), a solid (i.e., granular or powdered material), a slurry, or another process material. The system 100 generally operates to transform the material 104 from a less valuable state into more valuable and useful products, such as petroleum, chemicals, paper, food, etc. For example, an oil refinery performs industrial processes that can process crude oil into gasoline, fuel oil, and other petrochemicals. The transmitter assembly 102 may be used in other "industrial" settings (e.g., a manufacturing facility), such as to provide a location awareness system or another function.

The transmitter assembly 102 includes an industrial transmitter 110 and a transmitter mount 112 that is configured to attach the transmitter 110 to a structure 114 having an exterior surface 115. The structure 114 may be the process vessel 106 (e.g., a pipe, a tank, etc.), or a separate structure, such as a wall, a post, or other structure, which may be in the vicinity of the process vessel 106, or in another location of the industrial process plant.

The transmitter 110 may be configured to communicate with a computerized control unit 116 that is remote from the transmitter 110, such as in a control room 118. The control unit 116 may be communicatively coupled to the transmitter 110 over a suitable physical communication link or a wireless communication link. For example, the control unit 116 may be coupled to the transmitter 110 through a control loop 120, over which the transmitter 110 may receive power from control unit 116. Communications between the control unit 116 and the transmitter 110 may be performed over the control loop 120 in accordance with conventional analog and/or digital communication protocols. In some embodiments, the process control loop 120 includes a 4-20 milliamp process control loop, in which a process variable may be represented by a level of a loop current I flowing through the process control loop 120. Exemplary digital communication techniques include digital signals that are modulated onto the analog current level of the two-wire process control loop 120, such as the HART® communication standard. Other purely digital techniques may also be employed including FieldBus and Profibus communication protocols.

The transmitter 110 may also be configured to communicate wirelessly with the control unit 116 using a conventional wireless communication protocol. For example, the transmitter 110 may be configured to implement a wireless mesh network protocol, such as WirelessHART® (IEC 62591) or ISA 100.11a (IEC 62734), or another wireless communication protocol, such as WiFi, LoRa, Sigfox, BLE, or another suitable protocol.

The transmitter 110 may be used to communicate parameter information relating to the process material 104 to the control unit 116 and/or facilitate control of an aspect of the process, for example. The parameter information may be obtained using one or more conventional process variable sensors (represented by box 122). Exemplary sensors 122 include pressure sensors, temperature sensors, level sensors, flow rate sensors, and/or other sensors used to sense or measure a process parameter and produce signals indicating the sensed or measured parameter. The sensors 122 may also include location detection sensors, such as for detecting and retrieving information from RFID tags, for example. The sensors 122 may be physically connected to, or integrated with, the transmitter 110, the mount 112 or the assembly 102, or the sensors 122 may be displaced from the assembly 102.

Aspects of the process may be controlled using one or more conventional control devices (represented by box 122). Exemplary control devices 122 include actuators, solenoids, valves, and other conventional process control devices.

In some embodiments, the transmitter 110 includes transmitter electronics 123 contained in a housing 125. Exemplary transmitter electronics 123 include a controller 124, communications or output circuitry 126 for handling communications with the control unit 116, such as in accordance with the wired or wireless communication protocols described above, measurement or control circuitry 128, and/or other conventional transmitter electronics. The controller 124 may represent one or more processors (i.e., microprocessor, central processing unit, etc.) that control components of the transmitter 110 to perform one or more functions in response to the execution of instructions, which may be stored locally in patent subject matter eligible computer readable media or memory of the transmitter 110. The transmitter circuitry 128 may represent circuitry that communicates with the sensor or the control device 122 through a conventional wired or wireless connection.

Embodiments of the industrial transmitter 110 may take on other forms and perform different functions from those discussed above using the electronics 123. In one example, the transmitter 110 is configured for use in a location awareness system, which wirelessly communicates with tags 129 (e.g., radio frequency identification tags) to assist in determining a location of the tags 129. Here, the transmitter 110 may be one of several transmitters 110 that are positioned in a grid pattern within the processing plant, in accordance with conventional location awareness systems. The location awareness system determines a location of the individual tags 129 within the processing plant based on a received signal strength indicator of the communications between the tags 129 and the transmitters 110. Thus, the transmitter electronics 123 may represent the electronics that facilitates the communications with the tags 129 and other devices, such as the control unit 116 to implement the location awareness system, and track the location within the plant of personnel or assets, on which the tags 129 are attached.

In accordance with another embodiment, the transmitter 110 is in the form of a wireless antenna, and the transmitter electronics 123 may be conventional wireless antenna electronics, which may wirelessly communicate with devices, such as the control unit 116, in accordance with conventional techniques.

In yet another embodiment, the transmitter 110 may take the form of a display and the electronics 123 may be conventional display electronics.

The transmitter mount 112 is configured to attach the housing 125 of the transmitter 110 to the structure 114. In some embodiments, the transmitter mount 112 includes a stem member 130 and an adaptor 132. The stem member 130 includes ends 136 and 138. The end 136 is connected to the housing 125 of the transmitter. In some embodiments, the end 136 is integrally formed with the housing 125. Alternatively, the end 136 may include a connector 140 for attaching the stem member 130 to the housing 125 of the transmitter 110. The end 138 of the stem member 130 includes a connector 142 for connecting the stem member 130 to the adaptor 132.

The adaptor 132 is configured for attachment to the structure 114 and includes a base member 144. The base member 144 includes a connector 146 that cooperates with the connector 142 of the stem member 130 to connect the stem member 130 to the adaptor 132.

In some embodiments, the transmitter mount 112 includes a locking member 148 that is configured to secure the connection between the end 138 of the stem member 130 to the base member 144 of the adaptor 132. Embodiments of the locking member 148 generally fix or secure the connection between the connectors 142 and 146.

Thus, the transmitter mount 112 facilitates attachment of the transmitter 110 to the structure 114 by attaching the housing 125 to the end 136 of the stem member, and attaching the end 138 of the stem member 130 to the adaptor 132 using the connectors 142 and 146.

Figure 2:
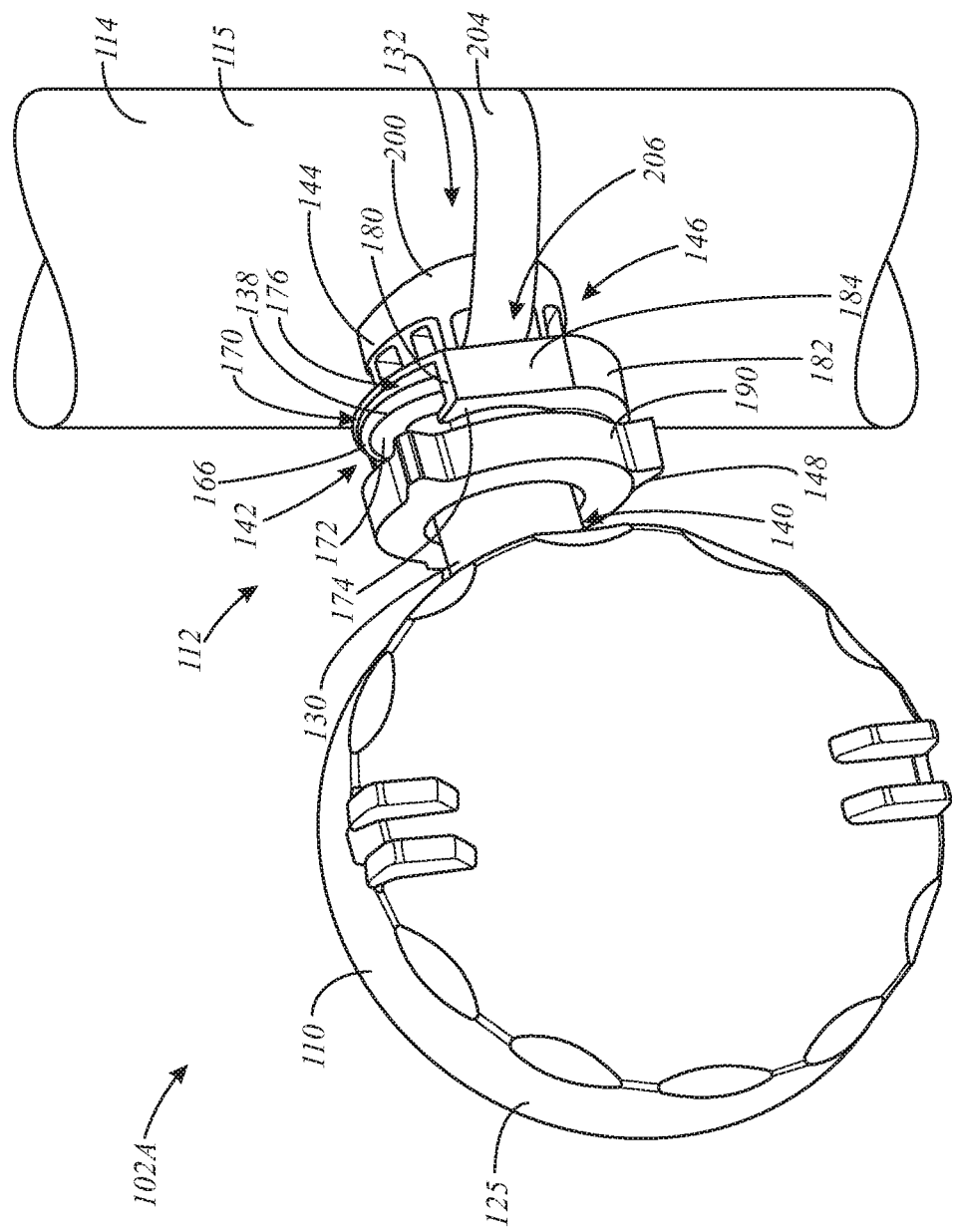
FIGS. 2 and 3 respectively are assembled and exploded isometric views of an exemplary industrial process transmitter assembly in accordance with embodiments of the present disclosure.
Figure 3:
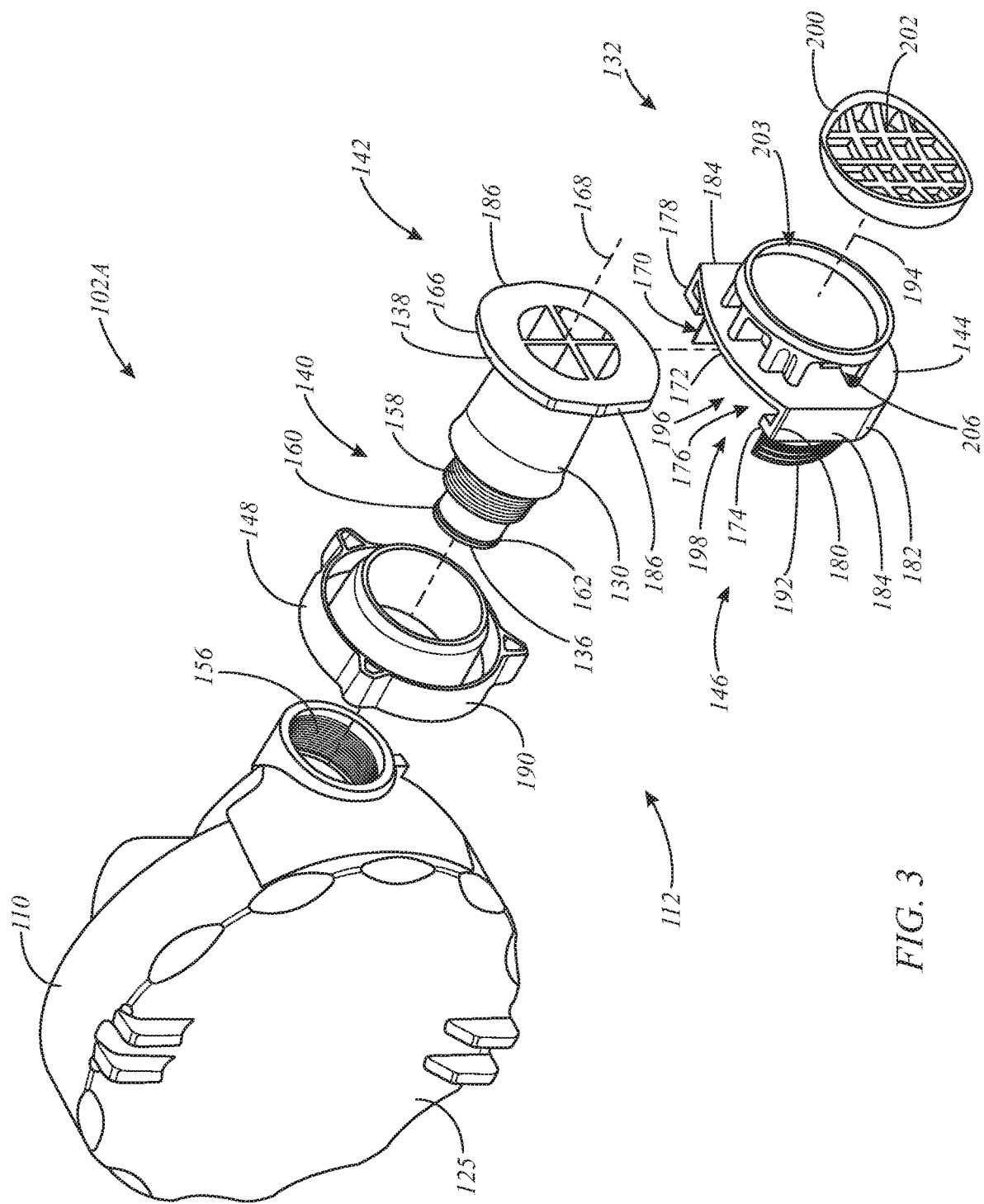
Figure 4:
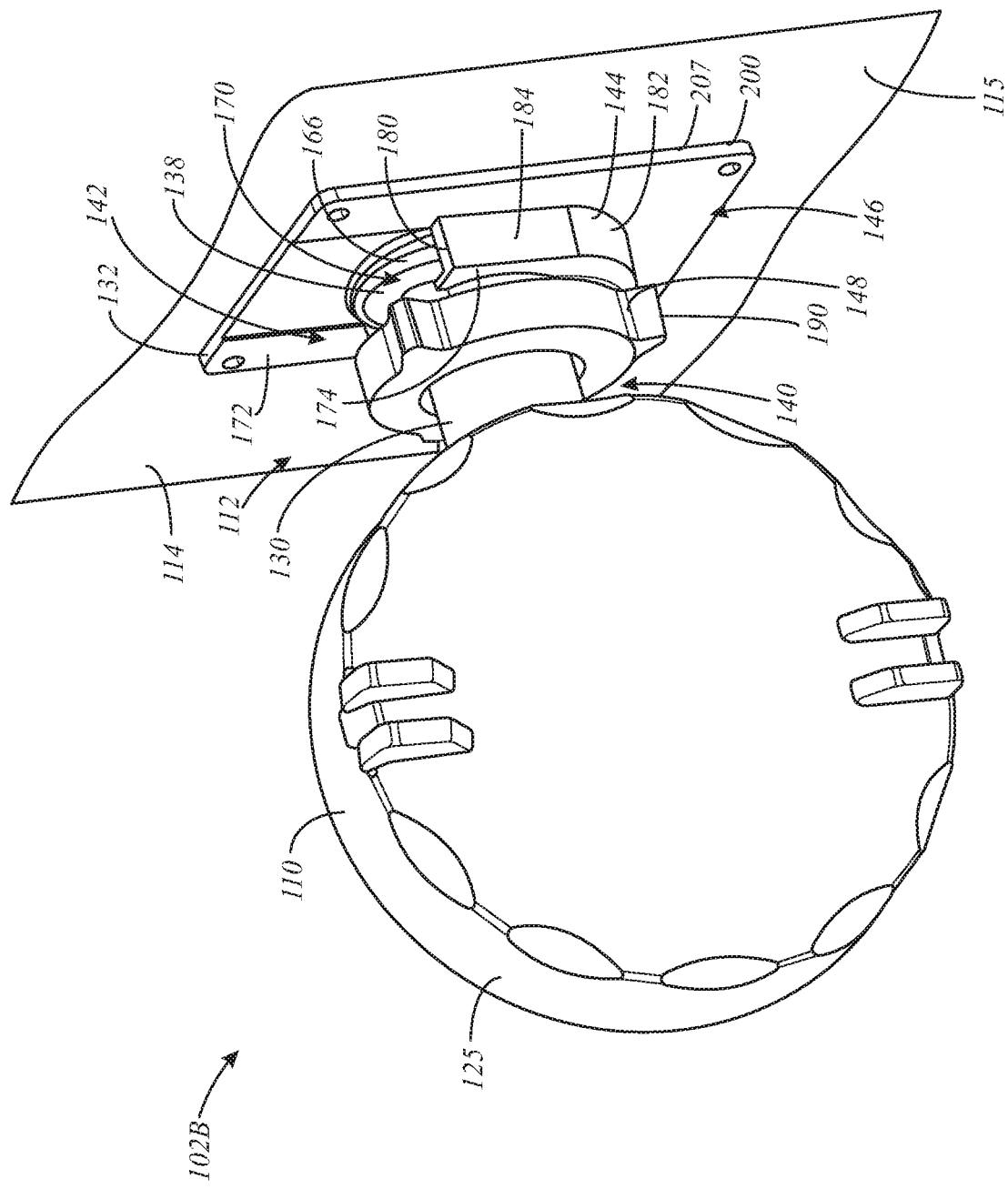
FIGS. 4 and 5 respectively show isometric assembled and exploded views of an exemplary industrial process transmitter assembly in accordance with embodiments of the present disclosure.
Figure 5:
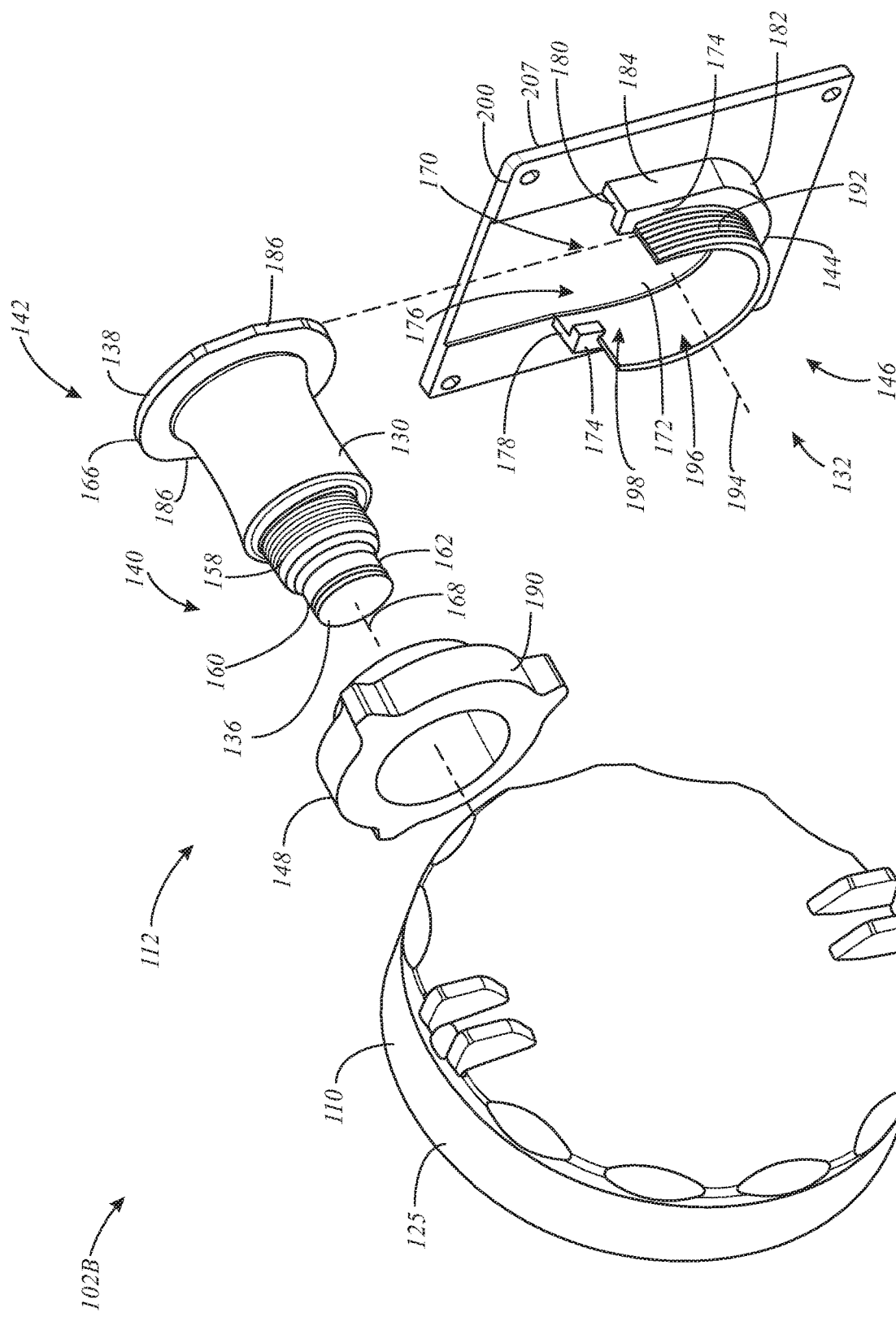
Figure 6:
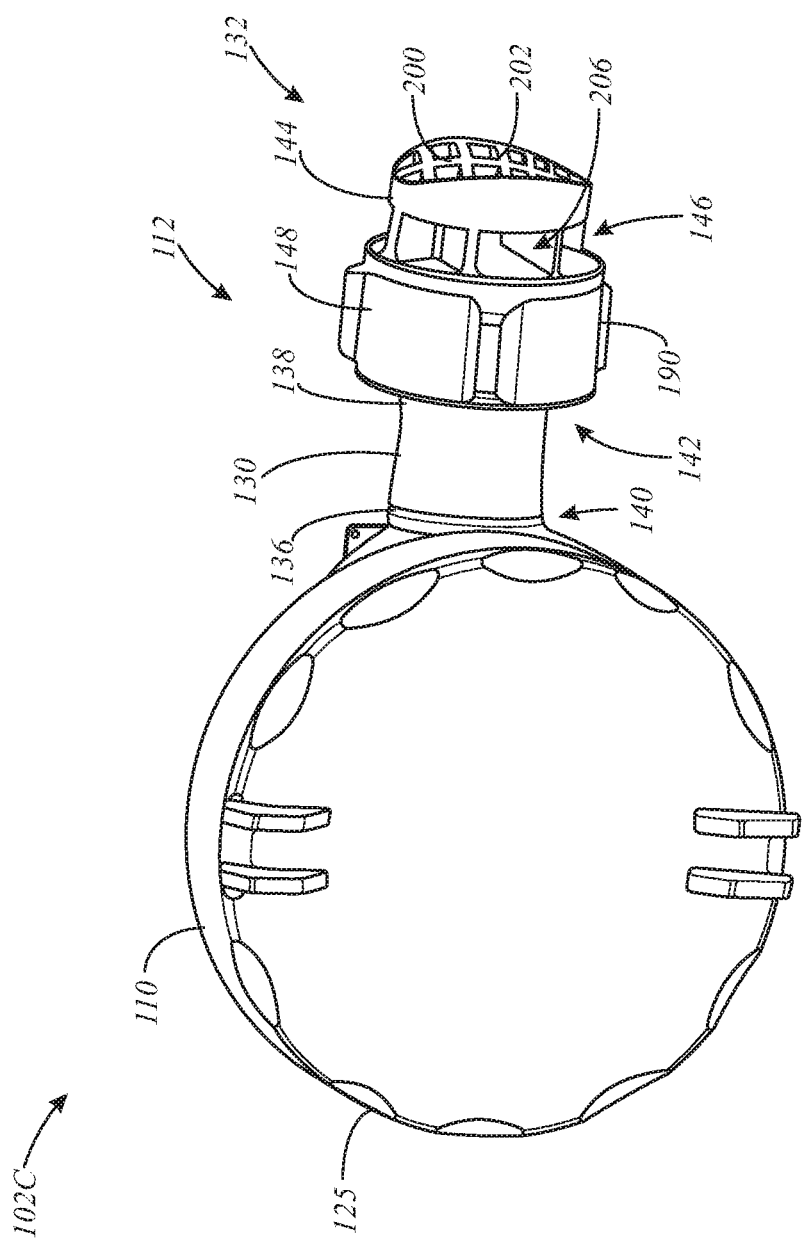
FIGS. 6 and 7 respectively show assembled and exploded isometric views of an exemplary industrial process transmitter assembly in accordance with embodiments of the present disclosure.
Figure 7:
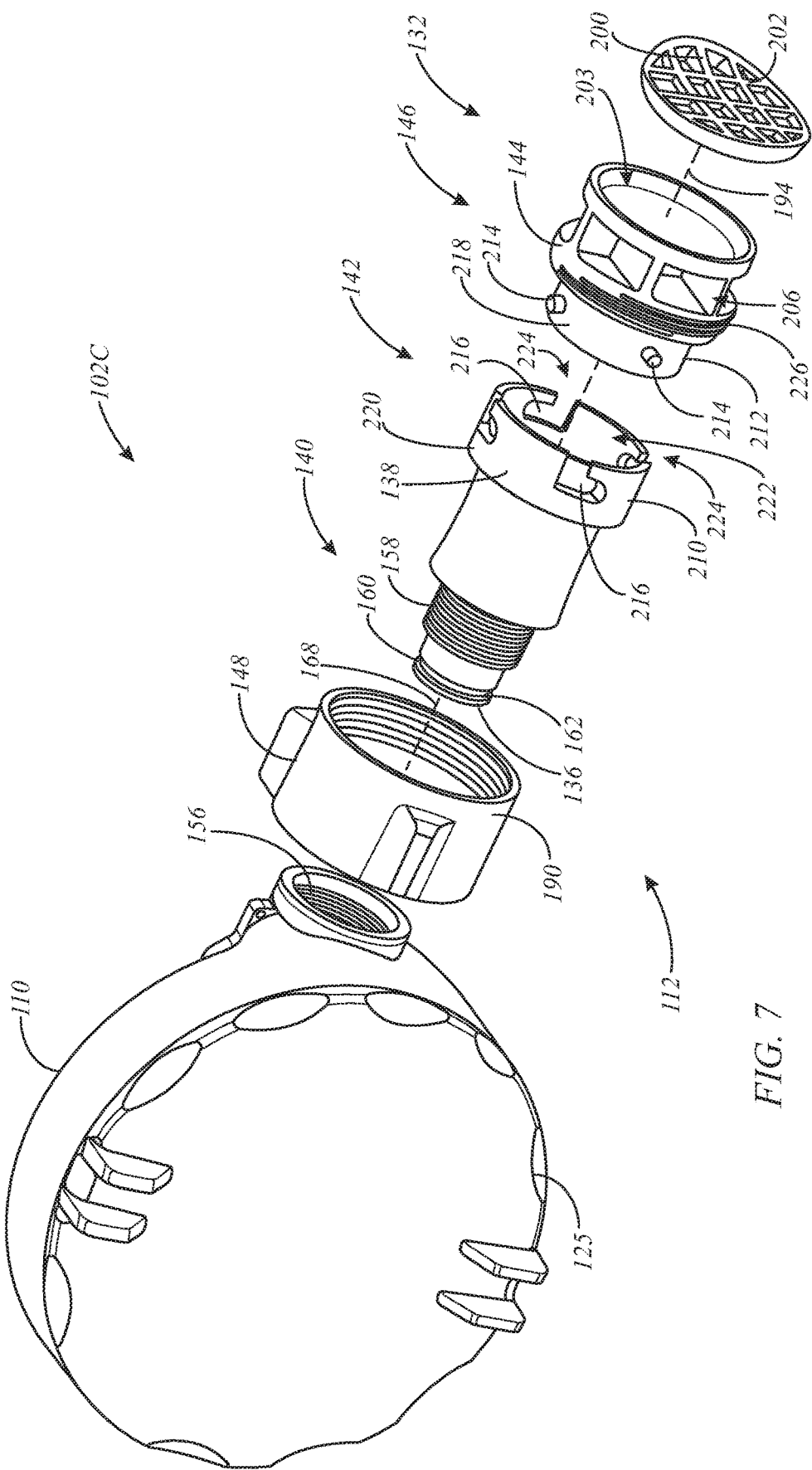

Additional embodiments of the process transmitter assembly 102 will be described with reference to FIGS. 2-7. FIGS. 2 and 3 respectively are assembled and exploded isometric views of an exemplary industrial process transmitter assembly 102A, in accordance with embodiments of the present disclosure. FIGS. 4 and 5 respectively show isometric assembled and exploded views of an exemplary industrial process transmitter assembly 102B, in accordance with embodiments of the present disclosure. FIGS. 6 and 7 respectively show assembled and exploded isometric views of an exemplary industrial process transmitter assembly 102C, in accordance with embodiments of the present disclosure.

The transmitter assemblies 102A-C share several features. Accordingly, embodiments of the transmitter mount 112 described below with reference to one of the assemblies 102A-C may apply to the other assemblies, unless otherwise specified.

Some embodiments of the housing 125 include a threaded socket 156, and the connector 140 of the end 136 of the stem member 130 includes a threaded cylindrical portion 158, as shown in FIG. 3. The threaded cylindrical portion 158 may be screwed into the socket 156 to attach the transmitter housing 125 to the stem member 130, as shown in FIGS. 2 and 4.

The transmitter mounts 112 of the assemblies 102A-C may include a seal formed between the housing 125 and the end 136 of the stem member 130 to protect the transmitter electronics 123 contained within the housing 125 from environmental conditions. In some embodiments, a portion of the end 136 of the stem member 130 is configured to form a seal with the housing 125. In some embodiments, the end 136 of the stem member 130 includes an annular groove 160 and an O-ring supported within the annular groove 160, as shown in FIGS. 3 and 5. When the end 136 is screwed into the socket 156 of the housing 125, the O-ring 162 forms a seal with the housing 125, such as with a corresponding cylindrical portion of the socket 156. Other suitable sealing techniques may also be used to form a seal between the end 136 of the stem member 130 and the housing 125.

Some embodiments of the connector 142 at the end 138 of the stem member 130 includes a flange 166 that is oriented substantially perpendicularly to the longitudinal axis 168 of the stem member 130, as shown in FIGS. 3 and 5. Embodiments of the connector 146 of the base member 144 include a slot 170, as shown in FIGS. 3 and 5. The slot 170 is configured to receive the flange 166 to secure the end 138 of the stem member 130 to the base member 144, as shown in FIGS. 2 and 4.

In some embodiments, the slot 170 is defined by an outer surface 172 of the base member 144 and a shoulder 174 that is displaced from the outer surface 172, as shown in FIGS. 3 and 5. When the flange 166 is inserted into the slot 170 it is supported between the outer surface 172 and the shoulder 174, as shown in FIGS. 2 and 4.

In some embodiments, the flange 166 is received within the slot 170 through an opening 176 that is formed between opposing ends 178 and 180 of the shoulder 174, and the outer surface 172 of the base member 144, as shown in FIGS. 3 and 5. The slot 170 may also be defined by a sidewall 182 that extends between the shoulder 174 and the surface 172 and extends from the end 178 to the end 180. The sidewall 182 may, for example, be U-shaped to provide the desired closed bottom for supporting the flange 166. Thus, the slot 170 may be substantially closed except at the opening 176. Accordingly, when the base member 144 is oriented such that the opening 176 to the slot 170 faces in an upward direction and away from the ground, the flange 166 may be maintained within the slot 170 by gravity.

In some embodiments, the slot 170 and/or the flange 166 are formed to substantially inhibit rotation of the stem member 130 about the axis 168 when the flange 166 is received within the slot 170. In some embodiments, the sidewall 182 includes opposing straight sections 184, as shown in FIGS. 3 and 5. Embodiments of the flange 166 include a pair of opposing straight edge portions 186 that are displaced from each other a distance that is slightly less than the distance separating the opposing straight sections 184 of the sidewall 182. The straight edge portions 186 may also be displaced a shorter distance from the center of the flange 166 than the remaining portions of the flange 166. As a result, the flange 166 must be inserted through the opening 176 and into the slot 170 with the straight edge portions 186 oriented substantially parallel to the straight sections 184 of the sidewall 182. Additionally, rotation of the stem member 130 about the axis 168 while the flange 166 is received within the slot 170 is inhibited due to engagement between the straight sections 184 and the corresponding straight edge portions 186.

In some embodiments, the locking member 148 attaches to the base member 144 and secures the flange 166 within the slot 170. In some embodiments, the locking member 148 comprises a threaded collar 190, through which the stem member 130 extends. In some embodiments, the threaded collar 190 may be screwed onto a threaded projection 192 that extends from the base 144. In some embodiments, the threaded projection 192 extends from the shoulder 174, as shown in FIGS. 3 and 5. With the flange 166 received within the slot 170 of the base member 144, the threaded collar 190 is screwed onto the threaded projection 192 to secure the flange 166 in the slot 170 and secure the attachment of the stem member 130 to the base member 144, as shown in FIGS. 2 and 4.

In some embodiments, the threaded projection 192 extends along a central axis 194, and includes an interior cavity 196 and a slot 198 extending along the central axis 194, as generally shown in FIGS. 3 and 5. When the flange 166 is inserted through the opening 176 and into the slot 170, the stem member 130 passes through the slot 198 in the threaded projection 192 and into the interior cavity 196. Additionally, the longitudinal axis 168 of the stem member 130 may be substantially coaxial to the central axis 194 when the flange 166 is fully received within the slot 170.

The adaptor 132 may be configured to mount to different types of structures 114. In some embodiments, the adaptor 132 includes a structure interface 200 that is configured to engage and generally conform to the exterior surface 115 of the structure 114 when the adaptor 132 is mounted to the structure 114.

In some embodiments, the structure interface 200 includes a concave surface 202 (FIG. 3) that is configured to conform to a curved exterior surface 115 (FIG. 2) of the structure 114 (e.g., pipe, post, tank, etc.). In some embodiments, the structure interface 200 having the concave surface 202 may be integral with the base member 144. Alternatively, the structure interface 200 having the concave surface 202 may be separate from the base member 144. In one embodiment, the base member 144 includes a receptacle 203 that receives the separate structure interface 202, as indicated in FIG. 3. This allows the transmitter mount 112 to utilize structure interfaces 200 having concave surfaces 202 with different radii of curvature, in order to accommodate curved surfaces 115 having different diameters, for example. As a result, the transmitter mount 112 may be fitted with an appropriate structure interface 200 that substantially conforms to the curved exterior surface 115 of the structure 114.

The adaptor 132 having the interface 200 with a curved surface 202 may be attached to the structure 114 using any suitable technique. In some embodiments, the adaptor 132 may be attached to the structure 114 using a strap 204, as shown in FIG. 2, or using another suitable technique. In some embodiments, the strap 204 extends through an aperture 206 in the base member 144 and is wrapped around the structure 114. The ends of the strap 204 may be joined together to secure the transmitter mount 112 and the attached transmitter 110 to the structure 114.

In some embodiments, the structure 114 includes a substantially flat surface 115 (e.g., a wall, a board, etc.), and the interface 200 includes a substantially flat surface 207 that engages the flat surface 115, as shown in FIG. 4. The interface 200 (e.g., flat panel) may be secured to the structure 114 using screws, an adhesive, or another suitable fastener.

The primary differences between the transmitter assembly 102C (FIGS. 6-7) from the transmitter assemblies 102A and 102B are the use of a different connector 140 at the end 138 of the stem member 130 and a different connector 146 of the base member 144. While the transmitter mount 112 of the assembly 102C is illustrated in FIGS. 6 and 7 as having a structure interface 200 having a curved surface 202 similar to that of the transmitter mount 112 of the assembly 102A, it is understood that the transmitter mount 112 of the assembly 102C may also include the structure interface 200 having the flat surface 207 of the transmitter mount 112 of the assembly 102B.

In some embodiments, the connector 142 at the end 138 of the stem member 130 includes a twist-lock connector 210, and the connector 146 of the base member 144 includes a twist-lock connector 212, as shown in FIG. 7. The twist-lock connectors 210 and 212 cooperate with each other to attach the end 138 of the stem member 130 to the base member 144. In some embodiments, the twist-lock connectors 210 and 212 include projections 214 and slots 216 that are configured to receive the projections 214. In some embodiments, the projections 214 extend substantially perpendicularly from a cylindrical wall 218 that extends from the base member 144 along the central axis 194. The slots 216 may be formed within a cylindrical wall 220 that defines a socket 222 that receives the cylindrical wall 218. The connector 210 may be attached to the connector 212 by inserting the cylindrical wall 218 within the socket 222 while the projections 214 are received within openings 224 to the slots 216. The connectors 210 and 212 are moved toward each other along the axis 194, which is substantially coaxial to the axis 168 of the stem member 130, until the projections 214 are fully received within the slots 216. The connectors 210 and 212 may then be rotated relative to each other about the central axis 194 or the axis 168 until the projections 214 reach the ends of the slots 216, to complete the attachment of the connectors 210 and 212.

Those skilled in the relevant art understand that adjustments may be made to the connectors 210 and 212 while providing the desired connecting feature. For example, the connector 142 may be equipped with the twist-lock connector 212, and the connector 146 may be equipped with the twist-lock connector 210, among other variations.

Another distinction between the transmitter mount 112 of the assembly 102C and the transmitter mounts 112 of the assemblies 102A and 102B is the location at which the locking member 148 attaches to the base member 144. In some embodiments, the base member 144 includes a threaded portion 226 to which the threaded collar 190 of the locking member 148 may be attached. In some embodiments, the threaded portion 226 is positioned between the connector 146 (e.g., twist-lock connector 212) and the structure interface 200. After joining the connectors 210 and 212 together, the locking member 148 may be screwed onto the threaded portion 226 to prevent the connectors 210 and 212 from disconnecting, as shown in FIG. 6. When in this fully assembled configuration, the longitudinal axis 168 of the stem member 130 may be substantially coaxial to the central axis 194 of the base member 144.

Although the embodiments of the present disclosure have been described with reference to preferred embodiments, workers skilled in the art will recognize that changes may be made in form and detail without departing from the spirit and scope of the present disclosure.

What is claimed is:

1. An industrial transmitter assembly comprising:
   an industrial transmitter including electronics contained in a housing; and
   a transmitter mount configured to attach the housing to a structure, the transmitter mount comprising:
     a stem member having a first end connected to the housing, and a second end including one of a flange oriented substantially perpendicularly to a longitudinal axis of the stem member and a first twist-lock connector;
     an adaptor configured for attachment to the structure and comprising a base member including one of a slot configured to receive the flange, and a second twist-lock connector configured to attach to the first twist-lock connector; and
     a locking member configured to secure the second end of the stem member to the base member.

2. The assembly of claim 1, wherein:
the stem member includes the flange;
the adaptor includes the slot;
the slot is defined by an outer surface of the base member and a shoulder displaced from the outer surface; and
the flange is supported between the outer surface and the shoulder.

3. The assembly of claim 2, wherein the flange is received within the slot through an opening formed between opposing ends of the shoulder and the outer surface of the base member.

4. The assembly of claim 3, wherein the slot includes a side wall extending from the outer surface of the base portion to the shoulder, the side wall including opposing straight sections.

5. The assembly of claim 4, wherein an outer edge of the flange comprises a pair of opposing straight edge portions, and insertion of the flange through the opening requires the straight edge portions to be oriented substantially parallel with the opposing straight sections of the side wall.

6. The assembly of claim 3, wherein:
the base member includes a threaded projection extending from the shoulder; and
the locking member comprises a threaded collar through which the stem member extends, the threaded collar configured to attach to the threaded projection of the base member.

7. The assembly of claim 6, wherein:
the threaded projection extends along a central axis, and includes an interior cavity and a stem slot extending along the central axis; and
the stem member passes through the stem slot and into the threaded projection to the interior cavity when the flange is received in the slot of the base member through the opening.

8. The assembly of claim 1, wherein:
the stem member includes the first twist-lock connector;
the adaptor includes the second twist-lock connector; and
the first and second twist-lock connectors include cooperating projections and slots for receiving the projections.

9. The assembly of claim 8, wherein:
the base member includes a threaded portion; and
the locking member comprises a threaded collar through which the stem member extends, and the threaded collar is configured to attach to the threaded portion of the base member.

10. The assembly of claim 9, wherein the threaded projection includes a central axis and the second twist-lock connector extends from the threaded projection of the base member along the central axis.

11. The assembly of claim 1, wherein:
the housing of the transmitter includes a threaded socket; and
the first end of the stem member comprises a connector including a threaded cylindrical portion, which is received within the threaded socket.

12. The assembly of claim 11, wherein the threaded cylindrical portion includes an annular groove and an O-ring supported within the annular groove that seals the socket of the housing.

13. The assembly of claim 1, wherein:
the structure includes a curved exterior surface; and
the adaptor includes a structure interface comprising a concave surface that is configured to conform to the curved exterior surface of the structure.

14. The assembly of claim 13, wherein the structure interface is one of:
received within a socket of the base member;
attached to the base member; and
integral to the base member.

15. The assembly of claim 13, wherein the transmitter mount includes a connecting strap configured to extend through an aperture in the base member and around the structure to secure the base member to the structure.

16. The assembly of claim 1, wherein:
the structure includes a flat exterior surface; and
the base member includes a structure interface comprising a flat panel that is configured to mount to the exterior surface of the structure.

17. An industrial transmitter assembly comprising:
an industrial transmitter including electronics contained in a housing; and
a transmitter mount configured to attach the housing to a structure, the transmitter mount comprising:
a stem member having a first end connected to the housing, and a second end including a flange oriented substantially perpendicularly to a longitudinal axis of the stem member;
an adaptor configured for attachment to the structure and comprising a base member including a flange slot defined by an outer surface of the base member and a shoulder displaced from the outer surface, and a threaded projection extending from the shoulder along a central axis and having an interior cavity and a stem slot extending along the central axis, wherein:
the flange slot is configured to receive the flange through an opening formed between opposing ends of the shoulder and the outer surface of the base member, and support the flange between the outer surface and the shoulder; and
the stem member passes through the stem slot in the threaded projection and into the interior cavity when the flange is received in the flange slot through the opening; and
a locking member comprising a threaded collar through which the stem member extends, the threaded collar configured to attach to the threaded projection of the base member and secure the second end of the stem member to the base member.

18. The assembly of claim 17, wherein:
the slot includes a side wall extending from the outer surface of the base portion to the shoulder, the side wall including opposing straight sections; and
an outer edge of the flange comprises a pair of opposing straight edge portions, and insertion of the flange through the opening requires the straight edge portions to be oriented substantially parallel with the opposing straight sections of the side wall.

19. An industrial transmitter assembly comprising:
an industrial transmitter including electronics contained in a housing; and
a transmitter mount configured to attach the housing to a structure, the transmitter mount comprising:
a stem member having a first end connected to the housing, and a second end including a first twist-lock connector;
an adaptor configured for attachment to the structure and comprising a base member including a second twist-lock connector and a threaded projection, wherein the first and second twist-lock connectors include cooperating projections and slots for receiving the projections and attaching the first and second twist-lock connectors together; and a locking member comprising a threaded collar through which the stem member extends, the threaded collar configured to attach to the threaded projection of the base member to secure the second end of the stem member to the base member.

* * * * *